Patented Sept. 21, 1926.

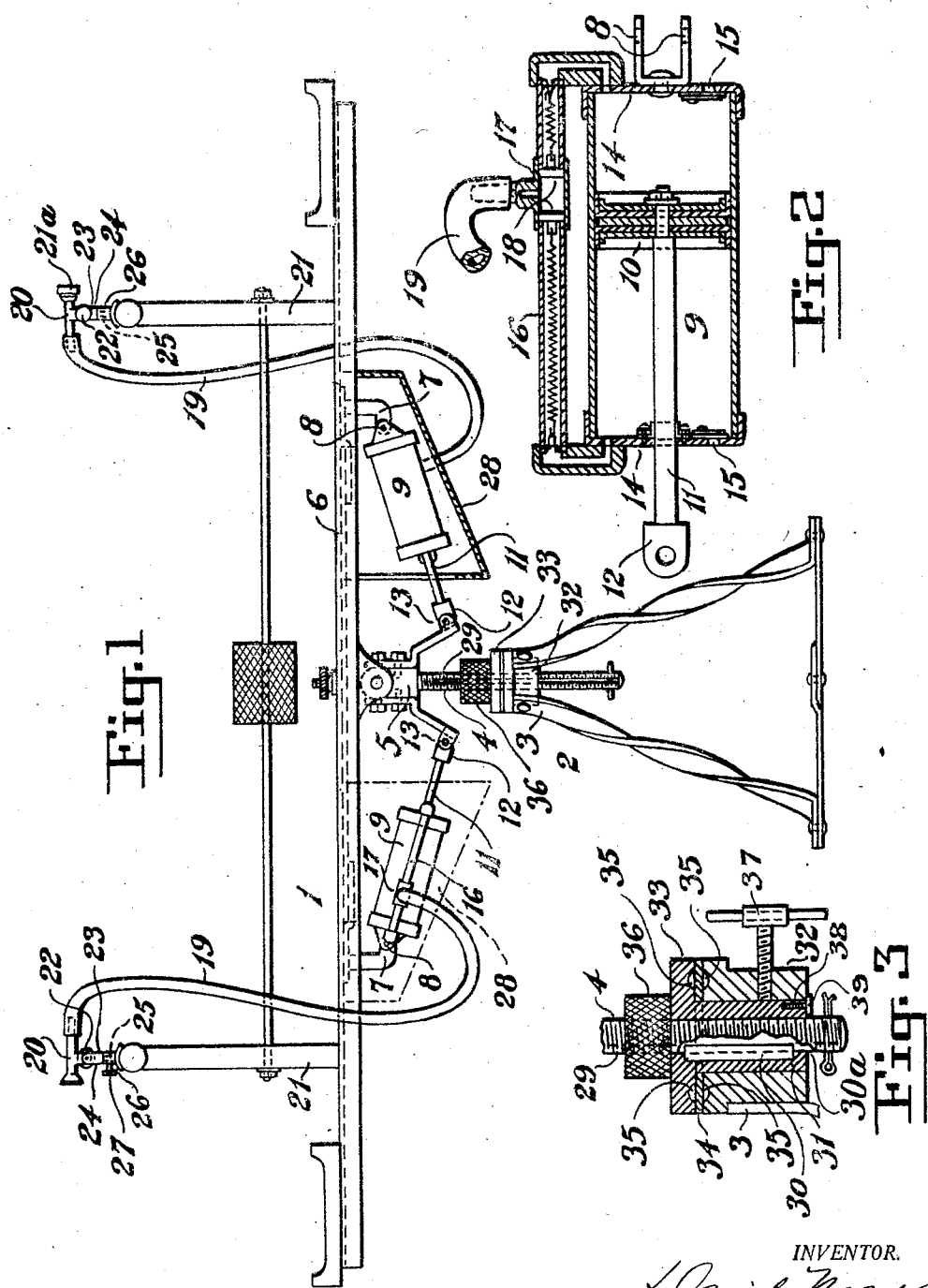

1,600,352

UNITED STATES PATENT OFFICE.

DAVID NAGY, OF NEW YORK, N. Y.

SEESAW.

Application filed September 10, 1925. Serial No. 55,490.

This invention relates to seesaws, and its principal object is to provide a seesaw with means whereby a blast of air may be directed against the users while operating the same. Another object is to provide a seesaw with means whereby sounds, such as whistling, may be produced while operating the same.

Another object is to provide a seesaw with improved means to permit horizontal rotation of its swinging beam about its fulcrum.

Other objects and advantages will hereinafter appear.

This invention is an improvement upon the seesaw shown and described in my Patent No. 1,550,040, dated August 18, 1925.

In the accompanying drawings,—

Fig. 1 shows a general elevation of the seesaw.

Fig. 2 is a cross-sectional elevation, in an enlarged scale, of the device herein used for producing the air blast.

Fig. 3 is a cross-sectional elevation, in an enlarged scale, showing the revolving mechanism for the seesaw beam.

The seesaw 1 is provided with a standard 2 comprising a fixture 3 in which is mounted an adjustable screw 4 carrying at its upper end a fitting 5 on which is fulcrumed the beam 6. From the beam 6 project hangers 7 to which are pivoted, at 8, air cylinders 9 having pistons 10, from which extend rods 11 that are in turn pivoted at 12 to brackets 13 secured to the fitting 5. The cylinderheads 14, Fig. 2, are provided with air-inlet valves 15, and conveying pipes 16 extend from said heads and are joined to T-fittings 17 in which are mounted air-outlet valves 18. To the fittings 17 are joined rubber tubes 19 which extend above the beam 6 and carry at their terminals nozzles 20, that are pivotally mounted upon the posts 21 facing the seats.

As the beam 6 reciprocates, therefore, while the seesaw is in use, the pistons 10 are continually reciprocated within the cylinders 9, and thereby draw in the air through the valves 15 and force same out through the valves 18 and into the tubes 19, in which manner a continuous blast of air is emitted from the nozzles 20 against the sitters. A suitable whistling device 21ª is secured to the mouth of each nozzle 20, which devices produce whistling sounds as the seesaw is operated, the same serving to amuse the users. A thumb-screw 22 passing through the pivot 23 of nozzle 20 serves to regulate and adjust the latter in a vertical plane, and said pivot is formed in a forked fitting 24 which is in turn provided with a shank 25 rotatably mounted in a fitting 26 secured to the post 21. A thumb-screw 27 passes through the fitting 26 and threads against the shank 25, and in this manner the position of the fitting 24 may be regulated and adjusted to set the nozzle 20 at any angle in a horizontal plane. A housing 28 is preferably provided to encase the cylinders at the underside of the beam 6.

The screw 4 is splined by means of a keyway 29 thereof engaging a feather 30 carried by a flanged journal 31 mounted in a bearing 32 secured to the standard-fixture 3, the screw being slidable vertically through the hole 30ª of the journal. Between the flange 33 of journal 31 and the top-face of bearing 32 is located a bronze gasket 34, and grooves 35 are provided, in said flange and bearing, which are filled with heavily oiled rags for the thorough lubrication of the journal and bearing surfaces. A nut 36 for adjusting the screw 4 normally rests upon the flange 33. Threading of the nut 36 in one direction adjusts the elevation of the beam 6, while turning of said nut oppositely lowers the set position of the beam. As the beam is swung and is being simultaneously revolved about the vertical axis of its fulcrum, therefore, the screw 4, nut 36, and journal 31 are rotated therewith, and the set elevation of the beam remains constant and unaffected by the horizontal revolution of the beam. A set-screw 37 threading through the bearing 32 and against the journal 31 locks the latter and the beam against rotation, if desired, and a set-screw 38 threading into the journal 31 with its cap 39 against the bearing 32 prevents accidental upward dislocation of the journal.

Variations may be resorted to within the scope of the invention, and portions of the improvements may be used without others.

Having thus described my invention, I claim:—

1. A seesaw having the combination with a standard, and a beam fulcrumed thereon, of mechanism for producing a current of air said mechanism being pivotally joined to said standard and said beam, said mechanism being operated by the motion of said beam, and means to convey the air from said mechanism above said beam.

2. A seesaw having the combination with a standard, and a beam fulcrumed thereon, of mechanism for producing a current of air, said mechanism being pivotally joined to said standard and beam, and said mechanism being operated by the motion of said beam, to produce an air current above the beam.

3. A seesaw having the combination with a standard, and a beam fulcrumed thereon, of air blowing mechanism including a cylinder, piston, and piston-rod, said cylinder being pivotally joined to said beam, said rod being pivotally joined to said standard, said cylinder piston and rod being operated by the motion of said beam to blow air, and a tube conveying the air above said beam.

4. A seesaw having the combination with a standard, and a beam fulcrumed thereon, of cylinder and piston mechanism pivotally joined to said standard and said beam, said mechanism being operated by the motion of said beam to blow air, and means to convey the air from said mechanism above the beam.

5. A seesaw having the combination with a standard, and a beam fulcrumed thereon, of air blowing mechanism including a cylinder, piston, and piston rod, said cylinder being pivotally joined to said beam, said rod being pivotally joined to said standard, said cylinder, piston, and rod being operated by the motion of said beam to blow air, a tube conveying the air above said beam, and a sound producing device at the upper end of said tube.

6. A seesaw having the combination with a standard, and a beam fulcrumed thereon, of means for mounting said beam on said standard including a sleeve, a screw for elevating said beam splined in said sleeve, said sleeve running in a fixed bearing, and a nut for operating said screw bearing against said journal.

In testimony whereof, I have signed my name to this specification this 9th day of September, 1925.

DAVID NAGY.